P. PHELPS.
MEASURING APPARATUS.
APPLICATION FILED APR. 15, 1915.
1,252,613.
Patented Jan. 8, 1918.
3 SHEETS—SHEET 2.
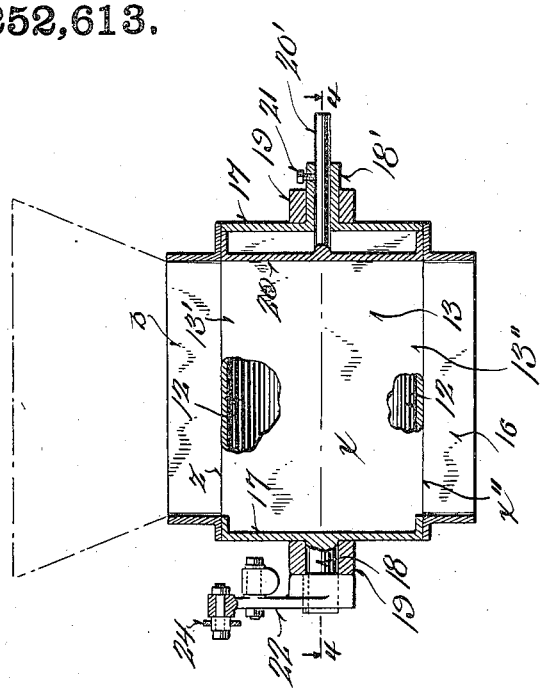
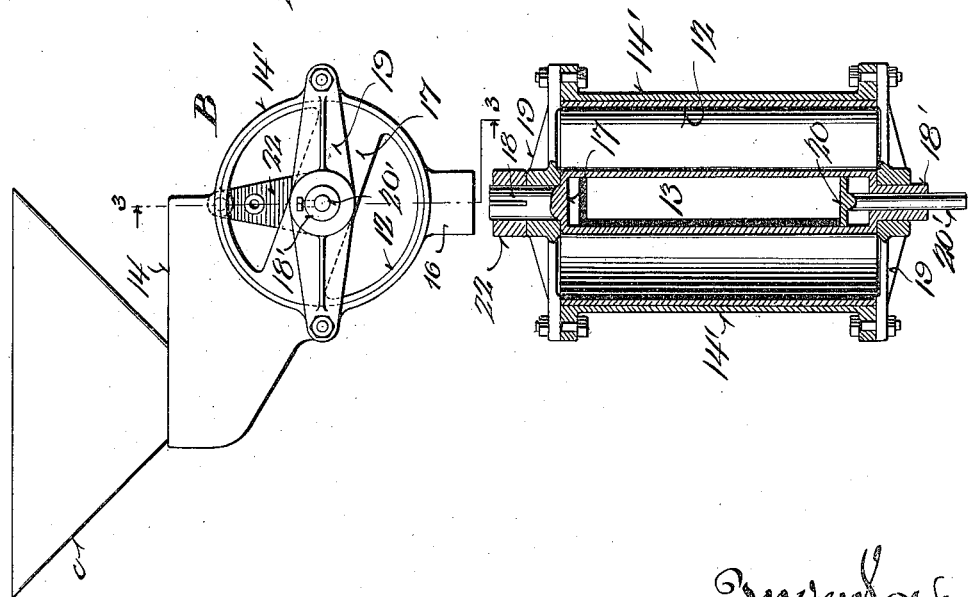

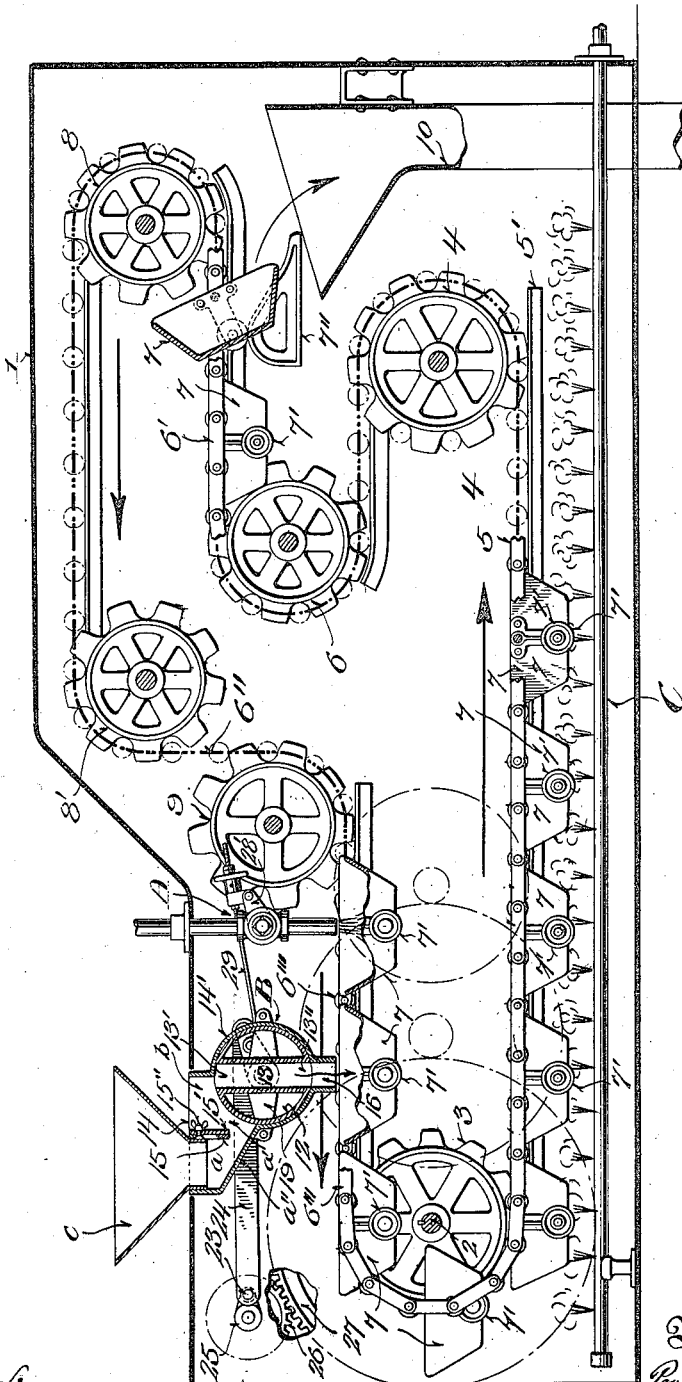

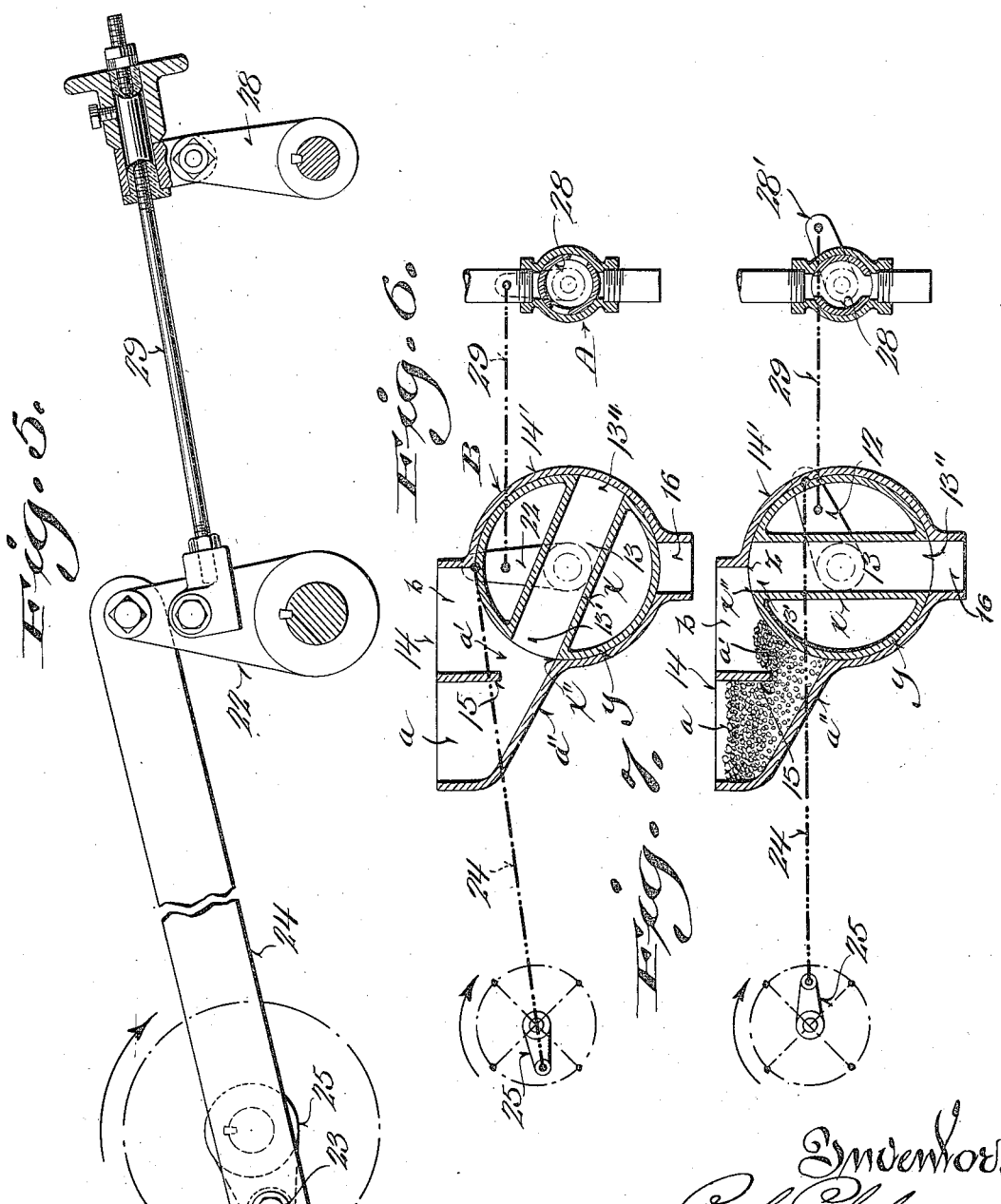

UNITED STATES PATENT OFFICE.

PAUL PHELPS, OF MILWAUKEE, WISCONSIN, ASSIGNOR TO INTERNATIONAL CANNING MACHINERY CO., OF OWEN, WISCONSIN.

MEASURING APPARATUS.

1,252,613.  Specification of Letters Patent.  Patented Jan. 8, 1918.

Application filed April 15, 1915. Serial No. 21,605.

*To all whom it may concern:*

Be it known that I, PAUL PHELPS, a citizen of the United States, and resident of Milwaukee, in the county of Milwaukee and State of Wisconsin, have invented certain new and useful Improvements in Measuring Apparatus; and I do hereby declare that the following is a full, clear, and exact description thereof.

My invention refers in a general way to measuring apparatus and apparatus for treating products to be canned and the primary object of said invention is to provide a simple, economical and effective dry-measuring device so constructed and arranged that a measured quantity of the product is admitted to an oscillatory container from a suitable source of supply followed by a cut off from said supply and a subsequent discharge of the material. The device is so arranged that during the entire cycle of operation as above described no shearing contact between the movable and fixed elements is had to break or mar the particles of the product. This construction is especially designed for canning equipment wherein green peas or other pulse variety of product is handled.

Other objects of my invention are to provide means for adjusting the measuring-shell, whereby measured quantities entering the same may be predeterminedly regulated;

To provide an actuating gear for the container so timed with relation to a series of traveling receiving buckets that when the device is opened for discharging a relative delay is had to permit full escape of its contents and a corresponding delay is effected when the member is in a filling position, the intervening opening and closing movements being accelerated to complete the cycle of operation;

To provide a fluid measuring device in connection with the products measuring device, whereby liquid is delivered in fixed quantities to the receiving buckets which are particularly adapted to contain measured quantities of water and peas for cooking purposes.

With the above and other objects in view the invention consists in certain peculiarities of construction and combination of parts as set forth hereinafter with reference to the accompanying drawings and subsequently claimed.

In the drawings

Figure 1 represents a diagrammatic view of a cooking and blanching apparatus embodying the features of my invention with parts in section and parts broken away to more clearly show the various novel features;

Fig. 2 illustrates an enlarged detail side elevation of the products measuring device embodying the features of my invention;

Figs. 3 and 4, sectional views of the same; the sections being indicated respectively by lines 3—3 of Fig. 2 and 4—4 of Fig. 3;

Fig. 5 illustrates a sectional elevation of a link gear connection between the product measuring valve and a fluid device, whereby the said connected members are reciprocated from a continuously driven rotatory crank, and Figs. 6 and 7 illustrate diagrammatic sectional views of the connected measuring member in their full open and full closed position showing the cycle of operation and positions assumed by the actuating mechanism.

Referring by characters to the drawings, 1 represents a casing in which is mounted a forward driving shaft 2 having mounted thereon companion sprocket-wheels 3, only one of which is shown. Companion sprockets 4 are suitably mounted at the rear or discharge end of the casing upon the same axial plane as the forward sprocket wheels, whereby the lower stretch of a carrier in the form of a chain belt 5 is caused to travel, being supported upon suitable rails 5'. From this point the endless carrier passes over the sprockets or sheaves 4 and forms a backward loop over sheaves or sprockets 6. The upper stretch 6' of this backward loop travels outwardly and constitutes the dumping stretch of a series of receiving buckets 7 which are pivotally mounted upon the carrier. The dumping stretch 6' of the carrier is guided over companion sprocket-wheels 8, from thence to corresponding alined forward sprocket-wheels 8', and from this point the carrier drops downwardly to form a vertical stretch 6″, being arranged to travel over a companion pair of idle sprocket-wheels 9, from which point the carrier travels to the front or driving sprocket-wheels 3, forming a receiving bucket filling stretch 6‴.

Positioned over the filling stretch 6‴ of the carrier is a fluid valve A and a products measuring device B, whereby water and pulse in measured quantities are successively discharged into the empty buckets as they travel under the reciprocative shells. Thereafter the batches of water and pulse are caused to drop down and as they travel along the carrier stretch 5 they are subjected to a blanching and cooking means, as indicated at C. Hence, in their travel over the cooking means the operation is completed and thereafter as the cooked batches travel forwardly upon the loop stretch 6′, tappet-wheels 7′ with which each bucket is provided, are arranged to engage a trip cam 7″, whereby the buckets are successively swung to a dumping position in order that their contents may be discharged in a chute 10 that delivers said contents to any desired collecting element 10′. Both the product measuring-shell and fluid valve are positioned and provided with actuating mechanism, whereby they will complete their discharge or delivery to the receiving buckets, while the same are traveling through a distance approximately one-half of their length and hence, owing to a quick cut-off, there is no liability of the materials being partly discharged into a succeeding bucket.

Referring especially to the novel construction of products measuring valve, 12 indicates an oscillatory cylindrical shell provided with a port 13 that extends therethrough, having an upper intake mouth 13′ in communication with a receiving boot 14, forming part of a cylindrical housing 14′, in which the valve-shell is mounted. The cylindrical housing is provided with a lower discharge port 16 in the form of a nozzle, being arranged to alternately register with the discharge mouth 13″ of the valve port 13 or cut off therefrom by the circular walls of the valve-shell. The receiving boot 14 is provided with an intermediate dam-wall 15, whereby the boot is divided into a receiving compartment $a$, and an overflow compartment $b$, the lower edge of said dam-wall being spaced a predetermined distance from the circular face of the valve-shell 12. Thus the valve-shell, when oscillated back and forth, maintains a fixed distance from the dam-wall edge, the space therebetween forming an overflow channel $a'$ between the compartments. The receiving compartment $a$ is fitted with a suitable hopper $c$. In order to regulate the discharge channel $a'$ of the receiving compartment, the dam-wall has preferably fitted thereto a plate 15′, the lower edge of which plate is adjusted up or down to vary the area of the overflow channel, and after such adjustment the said plate is locked by a suitable clamping nut 15″, which engages a bolt that projects from the dam-wall 15, it being understood that two or more of such clamping bolts may be employed and that the plate 15′ is formed with slots, as shown, whereby the adjustment is effected.

The bottom wall $a''$ of the receiving compartment $a$ is inclined toward the valve-shell 12 and intersects the circular portion of the housing at a point where the lower wall $x$ of the valve-port 13 effects registration, when the valve is moved to a receiving or filling position, as best shown in Fig. 6. Thus it will be seen, when the shell is in its filling position, its discharge mouth 13″ is closed and its intake mouth 13′ is open to receive material that will be discharged by gravity from the receiving compartment $a$ of the boot, the volume or stream of material being limited by the overflow channel space between the bottom wall $a''$ and the lower edge of the dam-wall plate 15′. Owing to the fact that the bottom wall $a''$ of the delivery compartment is inclined, it is manifest that a heavy load of material contained within the hopper $c$ will be to a certain extent supported, whereby the material will flow gently into the measuring port 13 of the device. The shell is momentarily delayed in its registered filling position to insure a complete operation and thereafter the shell intake mouth is caused to travel from its low registered position with relation to the bottom $a''$ upwardly, whereby the circular wall $y$ of the shell will cut off the supply and form an inclined bottom for a slight overflow from the receiving compartment $a$, which overflow will assume the position as indicated in Fig. 7 of the drawings. Hence it will be seen that the material at no time is subjected to a pinching or shearing operation relative to the fixed and movable parts of the mechanism and it is obvious that the downward pressure of the contents of the hopper $c$ will only cause a slight overflow into the compartment $b$. Furthermore, as the intake mouth of the shell rises to its discharging position, it will be observed that any surplusage about its mouth will be shed backwardly to the surface of the overflow, whereby an accurate measured quantity is contained within the port 13.

It will be further observed that the sharp edge $x''$ between the lower wall $x$ and circular shell body $y$ will not extend to the edge $z$ of the overflow compartment wall to crush or pinch the valve contents, but said edge $x''$ will be stopped short of the edge $z$ when the discharge mouth 13″ of the port is in register with the discharge port 15 of the housing.

The oscillatory reciprocative shell is provided with skeleton heads 17 having trunnions 18, 18′, which are revolubly mounted in hubs 19 of spider-arms that constitute part of the cylindrical portion 14′ of the valve housing. The skeleton heads 17 form end walls of the accumulating port 13 and in order to effect adjustment of the accumulator port whereby the measured quantities entering the same may be varied predeterminedly, I provide one end of the port with an adjustable head 20, as best shown in Figs. 3 and 4 of the drawings. This head is provided with a central stem 20′, which extends through a bore that is formed in the valve trunnion 18′. By this construction the head 20 can be adjusted in or out to increase or decrease the capacity of the accumulator port and after such adjustment the head is secured by a binding-screw 21, which binding screw passes through the trunnion 18′ and engages the head stem.

While I have shown and described one specific means for obtaining variation in the capacity of the accumulator port 13, it is obvious that various modifications may be resorted to without departing from the spirit of my invention and it is also manifest that I may, in some instances, substitute a lineally reciprocative shell for the rotary reciprocative shell shown, whereby the same result is obtained, in which instance the lineally reciprocative shell having an accumulator port would travel across the throat of the receiving boot upon an upward incline to effect the desired opening and closing operation.

It is also understood that I may, as shown in Figs. 6 and 7 of the drawings, in some instances, dispense with the adjustable plate 15′, which is shown in the products valve B, Fig. 1 of the drawings, whereby the communicating throat between the receiving compartment and overflow compartment is varied.

The gear mechanism for actuating the measuring devices, in this exemplification of my invention, is of the link type and comprises an arm 22 which is fast upon the valve shell trunnion 18. The extreme end of this arm is connected to a crank-pin 23 by a link 24, which link is carried by a shaft 25, the same being driven by a toothed pinion 26, which meshes with a toothed gear-wheel 27 that is fixed to the drive shaft 2, as best shown in Fig. 1 of the drawings, the driving gears being at a ratio of one to four, whereby the crank-pin 23 will make four complete revolutions to one of the drive-shaft 2, in order that four receiving buckets may pass a given point and receive successively charges of the product to be treated.

The fluid valve A forms no part of my invention, but is preferably of the rotary plug type 28, as best shown in Figs. 6 and 7, which plug carries an actuating arm 28′ that is connected by a link 29 to the arm 22 at a point below the extreme length of said arm, whereby the length of both arms with relation to the fluid valve is equal. The link 29, in this instance, is in the form of a rod which is in shackle connection with the fluid valve arm 28′, whereby adjustment with relation to the length of the strap 29 may be had. Thus the position of the ports in the fluid plug valve 28 may be accurately set with relation to the intake and discharge ports of said valve.

The crank-pin 23 is so spaced from the axis of its carrying shaft 25 and in proportion to the length of the actuating arm 22 that with each complete revolution of the said crank-pin an oscillatory movement is imparted to the last mentioned arm, whereby the rotary movement of the actuating crank-pin is converted into a reciprocative movement with relation to both measuring devices.

By referring especially to Figs. 6 and 7 of the drawings, it will be seen that when the port 13 of the shell 12 is in its extreme loading position, the crank-pin 23 is crossing the line of its greatest throw with respect to the arm 22 and hence during approximately an eighth of a revolution of the crank-pin in either direction from the position shown in Fig. 6, there will be but slight movement of the shell. In this loading position of the accumulating port 13 of the shell, it will be seen that the lower wall $x$ at the intake mouth of said port is upon an inclined plane or at an angle of approximately 60° from a vertical line intersecting the axis of the shell. The actuating arm 22 of the products valve and also the fluid valve arm 28′ in this extreme loading position is vertically disposed. Hence when movement of the crank-pin 23 takes place in the direction indicated by the arrow, it is obvious that the intake mouth of the shell port 13 will move upwardly and initially this movement will be slight until such time as the crank pin 23 has traveled through a distance of one-eighth of a revolution. The next quarter of a revolution imparted to the crank-pin 23 will practically complete the throw of the shell 12, whereby said shell practically assumes the extreme position indicated in Fig. 7 of the drawings and said shell is thereafter held in its emptying position during approximately one-quarter of a revolution that extends equally in both directions from the extreme point of the crank-pin, as shown in Fig. 7. The ported fluid valve-plug 28 will, through its connections, operate synchronously with the products measuring device, whereby a measured quantity of water supply is discharged into one receiving bucket, while the dry product or peas are discharged into the preceding receiving bucket. Hence it will be observed that the measuring devices, due to their peculiar link gear connections, are delayed at their filling and emptying positions and the speed of operation intervening is accelerated.

I claim:

1. A measuring device comprising a shell having a measuring chamber therein, extending there-through transversely of its axis, a housing for the shell having a bottom discharge port and an upper receiving boot, a dam-wall carried by the boot, the lower edge of which is spaced from the shell to form an open throat, an actuating mechanism for reciprocating the shell, whereby the intake mouth of the measuring chamber is caused to travel from a registered filling position relative to the boot throat to a point of cut off beyond the dam-wall followed by registration of the discharge mouth of the measuring chamber with the bottom port of the housing.

2. A measuring device comprising a reciprocative shell having a port extending there-through transversely of its axis, a housing therefor having a bottom discharge port, and an upper boot in communication with the intake mouth of the port, and means carried by the boot whereby the flow of material is cut off from the intake mouth of said shell by gravity.

3. A measuring device comprising a housing having a bottom discharge port and an upper product receiving boot, a shell reciprocatively mounted in the housing having a port extending therethrough transversely of its axis, the intake mouth of which when in filling position is upon a comparatively low plane, and means for elevating the plane of the intake mouth of the port preparatory to the discharge mouth of said port being brought into register with the bottom discharge port of the housing whereby the said intake mouth is lifted above the accumulated contents of the boot to cut off the supply from said port.

4. A measuring device comprising a housing having a lower discharge port and an upper boot, a cylindrical shell rotatorily reciprocative within the housing and provided with a port extending there-through transversely of its axis, a dam-wall positioned intermediate of the boot-walls having its lower edge spaced from the shell walls, whereby communicating receiving and overflow compartments are formed in said boot, and means for actuating the shell whereby the intake mouth of its port is caused to move from a filling position with relation to the receiving compartment to a higher plane than the overflow compartment coincident to registration of the discharge mouth of said port and the housing discharge port.

5. A measuring device comprising a housing having a lower discharge port and an upper boot, a shell reciprocatively mounted within the housing and provided with a port, a dam-wall positioned intermediate of the boot-walls having its lower edge spaced from the shell walls, whereby communicating receiving and overflow compartments are formed in said boot, and means for oscillating the shell whereby the intake mouth of its port is caused to move from a filling position with relation to the receiving compartment to a higher plane within the overflow compartment coincident to registration of the discharge mouth of said port and the housing discharge port.

6. In combination a pair of oscillatory measuring devices provided with ports extending there-through transversely of their axes, intake and discharge housings for said measuring devices having intake and discharge ports, actuating arms for the measuring devices arranged in substantially parallel planes when the ports are closed, a link connecting the measuring devices, a rotatory crank-pin positioned approximately at a right angle to the arms, the position of said crank pin with relation to its axis being shorter than either of the actuating arms, and a gear connection for imparting rotation to the crank-pin, whereby the arms are oscillated at varying speeds with relation to the throw of the actuating crank pin.

7. A dry product measuring device comprising a housing having a lower discharge port and an upper boot, an intermediate dam-wall carried by the boot, means for adjusting the depth of said dam wall with relation to the boot bottom, and a measuring shell reciprocatively mounted within the housing and provided with a port extending therethrough transversely of its axis.

8. A measuring device comprising a shell, and provided with a port extending therethrough transversely of its axis, a housing therefor having a lower discharge port, and an upper compartment adapted to contain a product, means for alternately submerging the intake mouth of the port within the product, and for lifting said mouth above the surface of the product following a registration of the discharge mouth of the device with the discharge part of the housing.

9. A dry product measuring device comprising a housing having a lower discharge port and an upper boot, an intermediate dam wall carried by the boot, means for adjusting the depth of said dam wall with relation to the boot-bottom, a member mounted within the housing and provided with a port extending therethrough transversely of its axis, and means for varying the area of the port.

In testimony that I claim the foregoing I have hereunto set my hand at Milwaukee in the county of Milwaukee and State of Wisconsin in the presence of two witnesses.

PAUL PHELPS.

Witnesses:
GEO. W. YOUNG,
M. E. DOWNEY.